United States Patent [19]

Kürten et al.

[11] Patent Number: 5,706,207
[45] Date of Patent: Jan. 6, 1998

[54] CONTROL EQUIPMENT FOR ELECTRICAL POWER GENERATORS

[75] Inventors: Heribert Kürten, Uttenreuth; Herbert Wagner, Buckenhof; Wolfgang Bayer, Erlangen, all of Germany

[73] Assignee: Siemens Aktiengesellschaft, Munich, Germany

[21] Appl. No.: 554,815

[22] Filed: Nov. 7, 1995

Related U.S. Application Data

[63] Continuation of PCT/DE94/00453, Apr. 25, 1994, published as WO94/27195, Nov. 24, 1994.

[30] Foreign Application Priority Data

May 7, 1993 [DE] Germany .............. P4315317.8

[51] Int. Cl.⁶ .................................................. G05B 15/02
[52] U.S. Cl. ............................................ 364/492; 364/139
[58] Field of Search ................................. 364/492, 494, 364/495, 493, 131, 132, 138, 139

[56] References Cited

U.S. PATENT DOCUMENTS

| | | | |
|---|---|---|---|
| 4,698,517 | 10/1987 | Tohya et al. | 364/492 |
| 4,742,445 | 5/1988 | Watanabe | 364/492 |
| 4,777,607 | 10/1988 | Maury et al. | 364/492 |
| 5,081,591 | 1/1992 | Hanway et al. | 364/492 |
| 5,278,772 | 1/1994 | Knupp | 364/492 |
| 5,323,328 | 6/1994 | Tanaka | 364/492 |
| 5,537,339 | 7/1996 | Naganuma et al. | 364/492 |
| 5,553,003 | 9/1996 | Harada et al. | 364/492 |

FOREIGN PATENT DOCUMENTS 4135803   5/1992  Germany .

OTHER PUBLICATIONS

VGB Kraftwerkstechnik, Issue 1, Jan. 1980, pp. 18–23.
Elektrizitätswirtschaft, 74th Year (1975), Issue 2, pp. 884–894.

Primary Examiner—James P. Trammell
Assistant Examiner—Kyle J. Choi
Attorney, Agent, or Firm—Herbert L. Lerner; Laurence A. Greenberg

[57] ABSTRACT

A control equipment for automatically controlling power units in an electrical power supply system includes a control unit being connected through a data transmission element to each power unit to be controlled, for receiving power-unit-specific measured variables and for emitting power-unit-specific reference variables. The control unit evaluates the measured variables cyclically by taking account of stored values and defining a control instruction for one or each power unit. Particularly effective control of the power units is possible through the use of such a control equipment, with both a predetermined reliability level of the power supply or electricity supply being maintained and an unnecessarily high power reserve being avoided.

9 Claims, 3 Drawing Sheets ized change in the power of a power unit. In a fossil-fuel-fired power unit, there are necessarily delay times in the steam generator between an increase in the fuel supply or furnace power and the power increase caused thereby. In order to bridge over such delay times in the event of a drop in frequency, steam turbine control valves, which have previously been held in the throttle-back position are, for example, opened within the first 5 or 30 seconds and steam reservoirs which are available are activated in this way and discharged virtually without any delay.

CONTROL EQUIPMENT FOR ELECTRICAL POWER GENERATORS

CROSS-REFERENCE TO RELATED APPLICATION

This application is a Continuation of International Application Serial No. PCT/DE94/00453, filed Apr. 25, 1994 published as WO94/27195, Nov. 24, 1994.

BACKGROUND OF THE INVENTION

Field of the Invention

The invention relates to a control equipment for automatically controlling power units in an electrical power supply system, including a data transmission element, and a control unit being connected through the data transmission element to each of the power units to be controlled, the control unit receiving power-unit-specific measured variables and emitting power-unit-specific reference variables.

German Published, Non-Prosecuted Patent Application DE 41 35 803 A1, corresponding to U.S. Pat. No. 5,323,328, discloses a device for using a distributed computer system to control a power station system which is constructed from a number of power units. In order to ensure that operating sequences are simplified, a central monitoring and control device writes information to power-unit-specific memories and outputs instructions to operate the power units.

In an electrical power supply system, reliable power supply is furthermore dependent on careful matching between the generation of electrical power by a number of power units and the consumption of that power by a number of loads in an electrical distribution grid. If the generation and consumption of electrical power are of equal size, then the grid frequency, which is an essential characteristic variable in an electrical grid, is constant. For example, in the interconnected European grid, its nominal value is 50 Hz. Any frequency error which occurs, for example, as a result of failure of a power unit or of the connection or disconnection of a load, can be regarded as a measure for increasing or reducing the generator power. At the same time, the frequency response depends, inter alia, on the number of power units included in the power supply system. A disturbance resulting from a power unit failure in a relatively large interconnected grid thus leads to a considerably smaller drop in the grid frequency than in a comparatively small insular grid.

As is described in the document entitled "VGB Kraftwerkstechnik" [VGB Power Station Technology], Issue 1, January 1980, pages 18 to 23, in addition to the stabilization of frequency errors within a power supply system, a further object is the maintenance of a predetermined transfer power at coupling points to adjacent supply networks. Specific requirements are therefore placed, for example by the Deutsche Verbundgesellschaft e.V. (DVG), on the frequency regulation and power regulation of a power unit. One requirement is, for example, that a power increase of 5% of the rated power of a power unit be available within 30 seconds, and half the power increase, that is to say 2.5%, be available after only 5 seconds.

Options for power regulation and frequency support are described in the already mentioned document "VGB Kraftwerkstechnik" [VGB Power Station Technology], Issue 1, January 1980, pages 19 to 23. While a number of action options, which can be carried out simultaneously or alternatively, exist for a rapid power change in the region of seconds, it is necessary to change the fuel supply for a long-lasting change in the power of a power unit. In a fossil-fuel-fired power unit, there are necessarily delay times in the steam generator between an increase in the fuel supply or furnace power and the power increase caused thereby. In order to bridge over such delay times in the event of a drop in frequency, steam turbine control valves, which have previously been held in the throttle-back position are, for example, opened within the first 5 or 30 seconds and steam reservoirs which are available are activated in this way and discharged virtually without any delay.

In addition to an increase in power by canceling the throttling-back of control valves of the steam turbine, low-pressure preheaters, which are heated by steam tapped off from the steam turbine, in the water/steam circuit of the steam turbine, are also disconnected. A condensate flow, which is passed through the low-pressure preheaters at the same time, can be stopped and increased again within a few seconds. That measure for rapid power regulation in fossil-fuel-fired power units by disconnection of the low-pressure preheating with the condensate being stopped is described, for example, in German Patent DE-PS 33 04 292.

Such a sudden increase in power, which is often called power reserve or second reserve for short, is limited in time because of the relatively small storage capacity of the steam reservoirs. In order to maintain long-term additional power it is therefore necessary to activate the so-called minute reserve, that is to say additional power which is provided within minutes. That is achieved, for example, by increasing the furnace power. In that case, the delay time and rate of change of the power increase depend on the type of power station, that is to say whether the respective power unit is, for example, a steam power system fired by mineral oil or natural gas, or is a gas and/or steam turbine system fired by coal. Reference should be made, for example, to the publication entitled "Elektrizitätswirtschaft" [Electricity Economics], 74th Year (1975), Issue 24, pages 884 to 894.

The second reserve which must be maintained during operation of a power unit increases the fuel costs by the loss resulting from the throttling-back of the turbine control valves. That is uneconomical, particularly during disturbance-free operation, in other words when the power balance between generation and consumption of the electrical power is in equilibrium.

SUMMARY OF THE INVENTION

It is accordingly an object of the invention to provide a control equipment for electrical power generators, which overcomes the hereinafore-mentioned disadvantages of the heretofore-known devices of this general type and which provides an economical option for controlling power units in an electrical power supply system, with both a predetermined reliability level of the power supply or electricity supply being maintained and an unnecessarily high power reserve being avoided.

With the foregoing and other objects in view there is provided, in accordance with the invention, in an electrical power supply system having power units, a control equipment for automatically controlling the power units, comprising a data transmission element; and a first control unit being connected through the data transmission element to each of the power units to be controlled; the control unit receiving power-unit-specific measured variables and emitting power-unit-specific reference variables; the control unit evaluating the measured variables cyclically by taking account of stored values and defining a control instruction for at least one of the power units; and the control unit determining a required or set-point value for a power element or portion of a grid load to be covered overall and determining a required or set-point value for an element or portion of an overall power reserve, for each power unit.

In the case of the control equipment, which includes a first control unit that is connected through a data transmission element to each power unit to be controlled, which receives power-unit-specific measured variables and which emits power-unit-specific reference variables, the control unit evaluates the measured variables cyclically, by taking account of the stored values, and defines a control instruction for one or each power unit. Such a control instruction can be a start or stop instruction for a power unit.

The first control unit expediently defines an operation plan and a power-unit reserve plan cyclically for a specific time period, for example for 24 hours, for each power unit. In order to do this, the control unit determines for each power unit a required value for its element of the grid load to be covered overall and a required value for its element of a total power reserve (total second reserve).

The total power reserve in hand is expediently continuously matched to the grid requirements. In accordance with another feature of the invention, in order to do this, the first control unit is connected to a second control unit which emits a correction value, for the total power reserve to be split between the individual power units, to the first control unit which, for its part, assigns a corrected power-unit power reserve to each power unit. The correction value is determined from an error in an actual value from a target value. In this case, the target value can be a predetermined power increase within a predetermined time period, for example the initially mentioned power increase of 2.5% of the rated power within 5 seconds (DVG specification). Alternatively, the target value can be a predetermined minimum grid frequency of, for example, 49 Hz. If the actual value is within a preferably adjustable tolerance band around the target value, then the first control unit defines the operation plan and/or reserve plan.

In accordance with a further feature of the invention, there is provided a first computation unit which is connected to the first control unit and the second control unit and determines a power reserve which governs the first control unit of this power unit, from power-unit-specific measured variables and from power-unit-specific constant parameters of a power unit. This power reserve is an additional power, which is provided within seconds and is expediently determined cyclically.

In accordance with an added feature of the invention, the delay time and the rate of change of a long-term additional power (minute reserve), to be provided by this power unit, are determined from power-unit-specific measured variables and from power-unit-specific constant parameters. A second computation unit, which is connected to the first control unit, is provided for this purpose.

The second control unit calculates disturbance frequencies using data from the first control unit on the basis of a disturbance case, which simulates the failure of the largest input supply power. Alternatively, profiles of actual grid disturbances can be supplied to the second control unit, from which corrected data are calculated for the model, that is to say improved model data. A memory for the storage of data is preferably provided for this purpose, and the data are derived from changes in the power distribution in the power supply system. Parameters stored in the second control unit can be modified through the use of these data and can be matched to the actual grid behavior.

The advantages achieved by the invention are, in particular, that a particularly favorable level of overall power reserve in hand is achieved through the use of the control equipment, by matching, which is carried out automatically at virtually any desired time intervals, to the requirements of the power supply grid. In this case, a predetermined reliability level of the electricity supply is maintained on one hand. On the other hand, an unnecessarily high second reserve and thus high fuel costs are avoided.

Other features which are considered as characteristic for the invention are set forth in the appended claims.

Although the invention is illustrated and described herein as embodied in control equipment for electrical power generators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
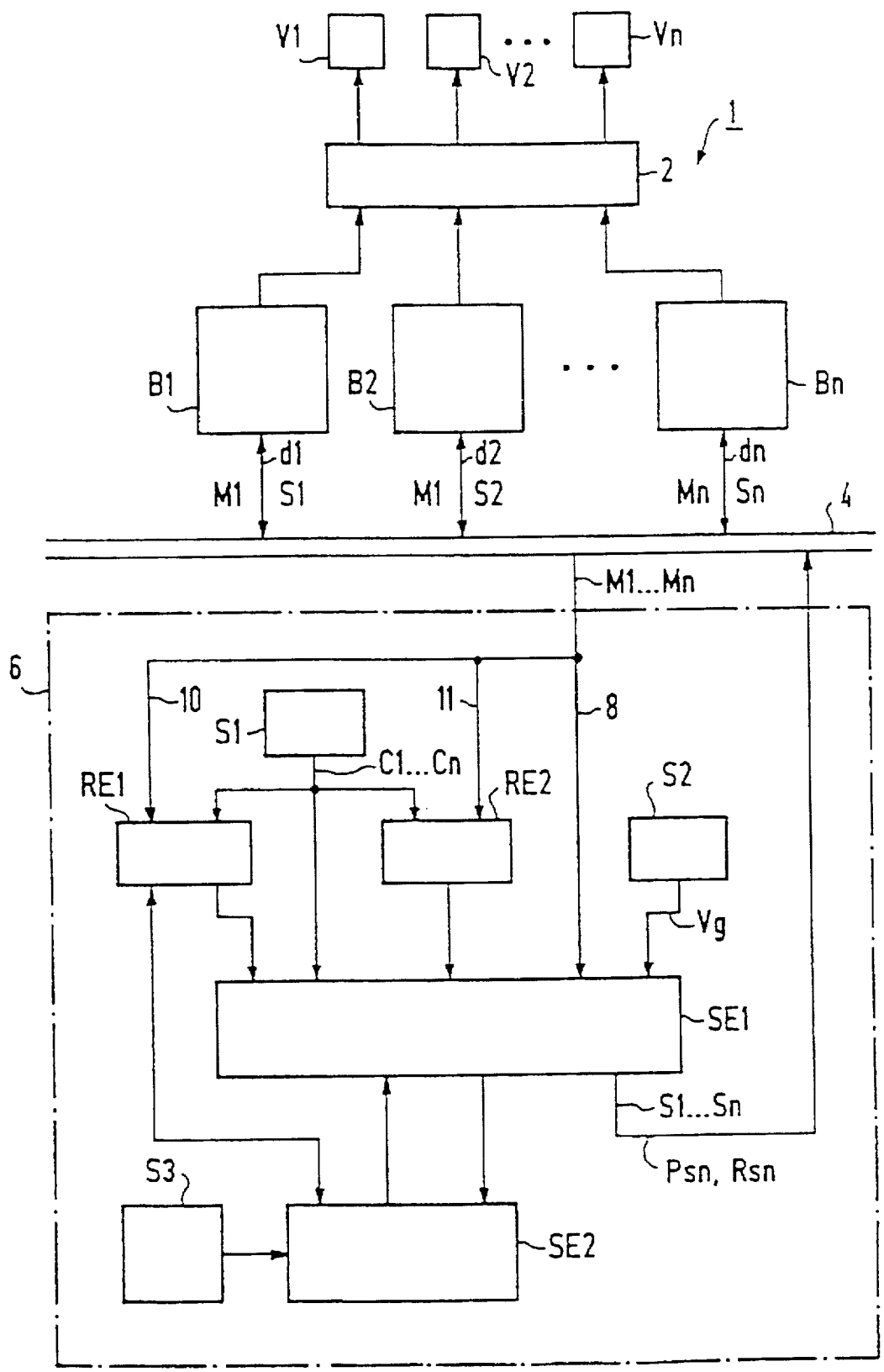
FIG. 1 is a block circuit diagram of power units connected to an electrical grid and control and computation units of control equipment used for automatically controlling the power units.

Referring now in detail to the figures of the drawing, in which mutually corresponding parts are provided with the same reference symbols, and first, particularly, to FIG. 1 thereof, there is seen a power supply system 1 which includes an electrical grid 2 having a number of power units B1 ... Bn and loads V1 ... Vn. The power units B1 ... Bn are connected through data lines $d_1 ... d_n$ to a data bus 4 which is connected to a control equipment 6. Alternatively, a separate data transmission element 4 can be provided for each power unit Bn, instead of a data bus 4 which is common to all of the power units B1 ... Bn.

The control equipment 6 includes a first control unit SE1 which is connected to a second control unit SE2. The control equipment 6 furthermore includes a first computation unit RE1, which is connected to the first control unit SE1 and to the second control unit SE2, as well as a second computation unit RE2 which is connected to the first control unit SE1. The control equipment 6 furthermore includes two data memories S1 and S2, which are each connected to the first control unit SE1, as well as a data memory S3 which is connected to the second control unit SE2.

As is indicated by an arrow 8, the first control unit SE1 receives power-unit-specific measured variables M1 ... Mn through the data bus 4 from the individual power units B1 ... Bn. The measured variables Mn are preferably supplied to the first control unit SE1 through the first computation unit RE1, in which the measured variables Mn can be provided with a power-unit-specific identification. In order to do this, the computation unit RE1 which is, for example, common to all of the power units Bn, is connected to the data bus 4, as is indicated by an arrow 10. The second computation unit RE2 is likewise connected to the data bus 4, as is indicated by an arrow 11.

A plurality of computation units RE1 can also be provided. Thus, for example, a separate computation unit RE1 can be provided for each power unit Bn. Each of computation units RE1 receives the power-unit-specific measured variables Mn and emits them to the first control unit SE1. The power-unit-specific measured variables Mn are, for example, actual values of a power-unit power (Pi) and of a fresh steam pressure (pi) as well as valve positions and temperatures being measured in or on a turbine housing.

Constant, power-unit-specific parameters C1 ... Cn are supplied from the memory S1 to the first control unit SE1 and to the first computation unit RE1. These constant parameters Cn are, for example, a maximum and a minimum power-unit power ($P_{max}$, $P_{min}$) as well as a maximum and a minimum fresh steam pressure ($p_{max}$, $p_{min}$). By taking account of the respective power-unit type, further power-unit-specific constant parameters Cn are identified, for example, as a power regulation range, a maximum power reserve (second and/or minute reserve), a power-dependent response of the heat consumption, and starting, running and stopping times.

Furthermore, grid-specific data are supplied from the memory S2 to the first control unit SE1. These data, which are stored in the memory S2, are general specifications Vg for grid operation. Such a specification can be a target value, for example 49 Hz, of a minimum frequency which must not be undershot. The specification V can alternatively be the time response of an overall power reserve. In this case, the DVG specifications mentioned initially, that is to say an increase in the rated power by 5% within 30 seconds and 2.5% within 5 seconds, are defined as limit values.

As will be explained below in more detail with reference to FIG. 2, the first control unit SE1 evaluates the measured variables M1 ... Mn cyclically taking into account the parameters C1 ... Cn and the specifications V and determines a control instruction S for one or more of the power units B1 ... Bn. This control instruction S is supplied as a power-unit-specific control instruction S1 ... Sn through the data bus 4 to that or to each power unit B1 ... Bn which is to be controlled. The control instruction S is, for example, a start instruction for a power unit Bn which must additionally be connected, or a stop instruction for a power unit Bn which is to be disconnected. The first control unit SE1 can emit control instructions S1 ... Sn, which follow one another in time, for starting or stopping a plurality of the power units B1 ... Bn.

The definition of a start instruction Sn is advantageously produced by taking account of the previous history of a power unit Bn. The first control unit SE1 thus determines a power-unit-specific starting time by taking account of a stationary time and a time which is required for synchronization of the power unit Bn to the grid 2. On the basis of this starting time, the first control unit SE1 emits a control instruction Sn to start this power unit Bn even before a power input supply, which is actually required and has been determined to be economical, of this power unit Bn, into the grid 2.

The first control unit SE1 advantageously splits the grid load to be covered overall and the overall power reserve and determines for each power unit Bn a required or set-point value (Psn) for its element or portion of a grid load which is to be covered overall, and a required or set-point value (Rsn) for its element or portion of an overall power reserve. When the grid load which is to be covered and the overall power reserve are split, the effectiveness or economy of the respective power unit Bn is considered as an essential criterion, for example with respect to the primary energy to be used and the efficiency.

Figure 2:
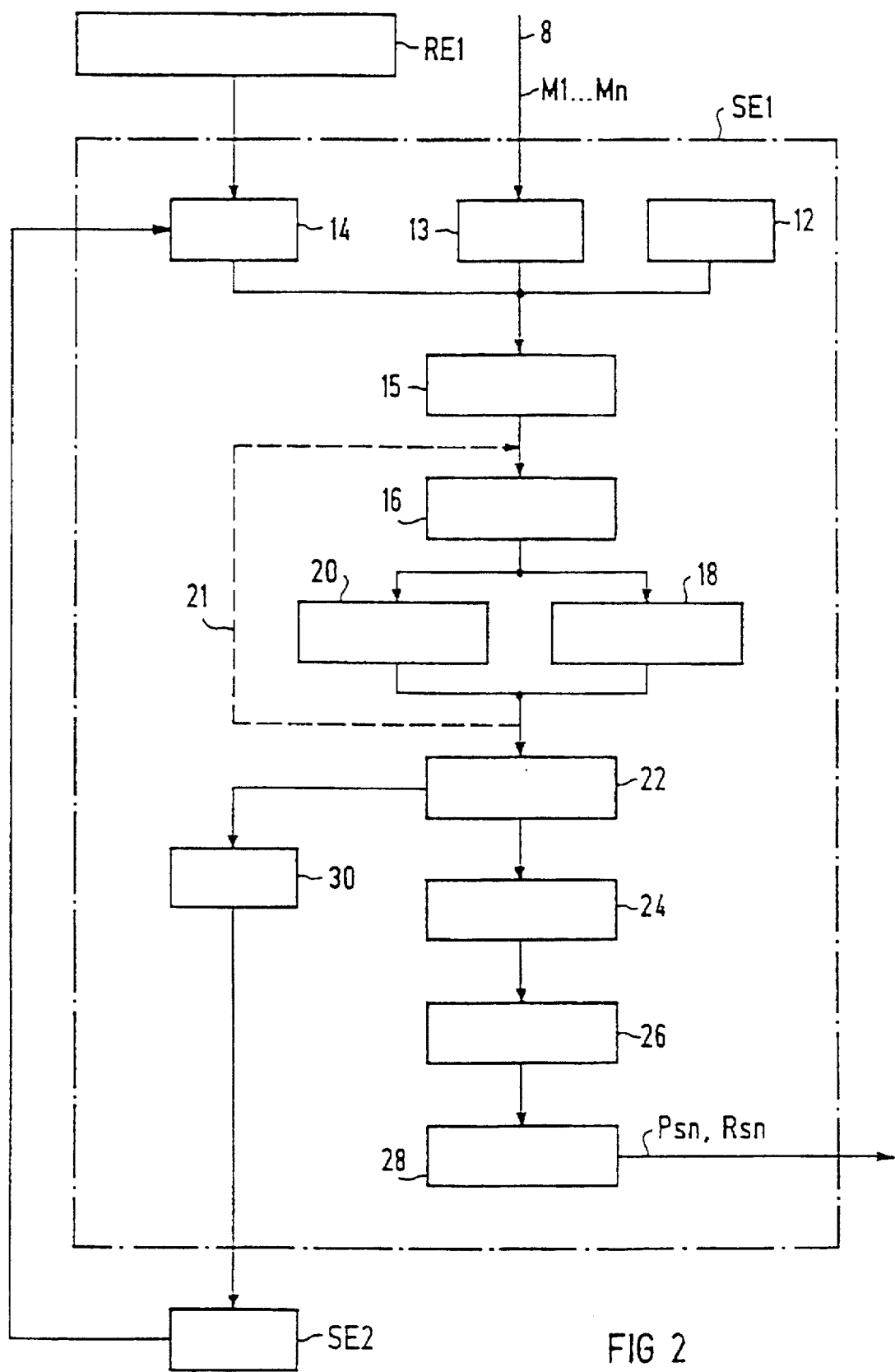
FIG. 2 shows is an enlarged circuit diagram of a first control unit of the control equipment according to FIG. 1.

According to FIG. 2, the first control unit SE1 thus includes a first data memory 12 in which model data are stored for mapping of the respective power unit Bn. Such permanently defined data are, for example, the maximum and the minimum power-unit power ($P_{max}$, $P_{min}$). The measurements M1 ... Mn are buffer-stored as on-line process data in a second data memory 13. Further, conditioned process data from the first computation unit RE1 are buffer stored in a third data memory 14. A device 15 for data initialization selects those data which are required for the current application, from these data which are stored in the data memories 12, 13 and 14. First of all, a power-unit selection computer 16 uses these data to select the particularly suitable power unit or units Bn. The splitting of the power between the individual selected power units Bn is carried out in a computer 18. The power reserve is calculated and checked in a computer 20. If the conditions, which are specified by using a model calculation, for the overall power reserve are not satisfied, then a further power unit Bn, for example, is selected in the power-unit selection computer 16. As is illustrated by a dashed arrow 21, this process is repeated in a loop until a power-unit selection is made which satisfies the reserve condition. If this condition and a grid-specific criterion which is derived from the specifications Vg and which has been interrogated in a comparison stage 44 (seen in FIG. 3) of the second control unit SE2 are satisfied, then branching to a stage 24 takes place in a stage 22 of the first control unit SE1. Short-cycle updating of the load splitting is carried out in this stage 24, and short-cycle updating of the reserve splitting is carried out in a further stage 26. The power-unit specific required values, which are formed in a third stage 28 for partial loads Psn and partial power reserves Rsn, are supplied through the data bus 4 to the corresponding power units B1 ... Bn as control instructions or reference variables S1 ... Sn, for example for their turbine and/or generator regulators.

If the comparison in the comparison stage 44 of the second control unit SE2 yields the result that the required value or target value of the criterion being sought is not satisfied, then branching takes place in the stage 22 to a stage 30 in which a current operation plan for the load splitting and a reserve plan for the reserve splitting are stored. The data produced by the first control unit SE1 for the current overall power reserve are supplied to the second control unit SE2.

Figure 3:
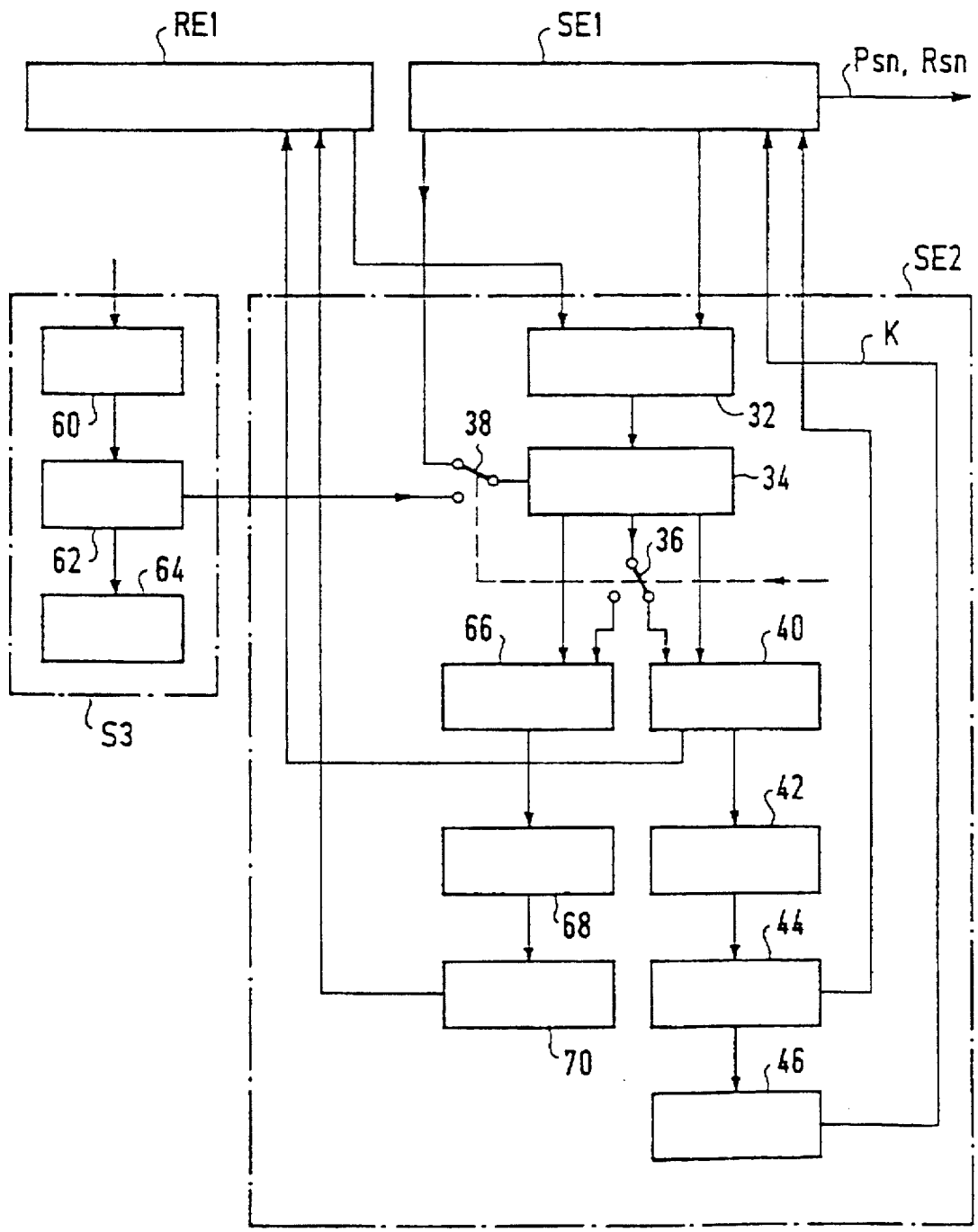
FIG. 3 is a further enlarged circuit diagram of a second control unit of the control equipment according to FIG. 1.

As is illustrated in FIG. 3, these data are initially stored in a memory 32. Basic data and required values to describe the grid 2 and for mapping of the power units B1 ... Bn as well as a simulation model for a power-unit failure are also stored in this memory 32. The maximum failure power, that is to say a failure of that power unit Bn which is supplying the currently greatest power into the grid 2 is, for example, simulated in this model. When switches 36 and 38 are in the position illustrated, a selection computer 34 reads those data which are required to calculate a disturbance sequence from the data memory 32 and passes these data on to a computer 40. The disturbance sequence is calculated there, by taking account of the current overall power reserve. A time response of the overall power reserve being determined in this way is emitted by the computer 40 to the first computation unit RE1. An actual value of the grid-specific criterion being sought is derived from the disturbance sequence, is stored in a result memory 42 and is compared in the comparison stage 44 with the target value of the criterion being sought. As already mentioned, this criterion is, for example, a minimum frequency in the case of a relatively small insular grid or a required behavior of the overall power reserve as a function of time in a relatively large interconnected grid (DVG specification).

If the criterion being sought is not satisfied, then a correction value K, which has been determined in a stage 46, is supplied to the first control unit SE1. If, for example, the actual value is 10% beyond an adjustable tolerance band around the target value, then the correction value K is greater than or less than unity. An overall power reserve, which is increased or reduced by 10% for example, is then specified by the first control unit SE1 in a subsequent iteration, that is to say in a first iteration step. This iteration process with convergence to the target value is continued until the criterion being sought is satisfied. Only then are the operation plan, which was the last one stored in the stage 30 of the first control unit SE1 and has the required power values Psn, and the reserve plan, which was the last stored and has the required partial reserve values Rsn, activated.

If disturbances occur in the power supply system 1, then data which are derived from changes in the load distribution in the power supply system 1 are stored in the memory S3 of the control equipment 6. Parameters which are stored in the second control unit SE2 for the simulation model are changed through the use of these data. In order to do this, grid disturbances are recorded in a first stage 60 of the memory S3. The data which are conditioned in a further stage 62 are stored in a documentation memory 64. These data, which are conditioned in the stage 62, are supplied to the selection computer 34 of the second control unit SE2 after operation of the switches 36 and 38, with the iteration process being interrupted through the stage 46 and the first control unit SE1. The data selected by the selection computer 34 from the memory S3 are supplied to a stage 66 of the second control unit SE2 in order to identify new power-unit parameters. The parameters on which the simulation model is based are varied there until the disturbance sequence calculated from the simulation model corresponds to, or at least approximates, the actual disturbance response. These parameters are stored in a result memory 68 and can be selected in a stage 70 as required, for example by taking account of selection criteria stored in a knowledge base of a non-illustrated expert system, and can be supplied from there to the first computation unit RE1. These parameters are read from the first computation unit RE1 to the data memory 32 of the second control unit SE2, and replace the previous model parameters there. In consequence, the simulation model on which the iteration process running in the second control unit SE2 is based is further matched to actual grid processes and disturbance sequences.

The overall power reserve, which has been determined in the manner described above by the first control unit SE1 of the control equipment 6 and is to be provided by the power units B1 . . . Bn, and which overall power reserve is composed of the partial power reserves Rsn, is a second reserve which is available only for a limited time. This time limitation is dependent on storage capacities which are maintained or provided in the power units B1 . . . Bn and which can be activated when required. In order to provide permanent or long-term additional power (minute reserve), the furnace power, for example, must be correspondingly increased in the power units or individual power units B1 . . . Bn. The second computation unit RE2 thus determines, from the power-unit-specific measured variables M1 . . . Mn and from the power-unit specific constant parameters C1 . . . Cn, a long-term additional power or minute reserve which can be activated by the corresponding power unit Bn. In order to do this, the rate of change with time (gradient), which can be determined from a time-dependent power response between a power-unit-specific actual power (Pi) and a power-unit-specific maximum power ($P_{max}$) by taking account of a delay time, is used as a measure of a long-term additional power to be provided. The minute reserve, which is calculated by taking account of the power response that is possible from the respective power unit Bn, is used as the basis of a calculation which is carried out cyclically, for example at intervals of 15 minutes, in the first control unit SE1.

We claim:

1. In an electrical power supply system having power units, a control equipment for automatically controlling the power units, comprising:

a data transmission element;

a control unit being connected through said data transmission element to each of the power units to be controlled;

said control unit receiving power-unit-specific measured variables and emitting power-unit-specific reference variables;

said control unit evaluating the measured variables cyclically by taking account of stored values and defining a control instruction for at least one of the power units; and said control unit determining for each power unit a required value for a fraction of a grid load to be covered overall and a required value for a fraction of an overall power reserve.

2. The control equipment according to claim 1, wherein the control instruction is a start instruction.

3. The control equipment according to claim 1, wherein the control instruction is a stop instruction.

4. The control equipment according to claim 1, wherein said control unit is a first control unit, and including a second control unit being connected to said first control unit and emitting a correction value to said first control unit for a total power reserve to be split between the individual power units, an approximation of an actual value to a target value being carried out, and said first control unit assigning a corrected power reserve to each of the power units.

5. The control equipment according to claim 4, wherein the target value is within an adjustable tolerance band.

6. The control equipment according to claim 4, including a computation unit being connected to said first control unit and to said second control unit for determining a power reserve from the power-unit-specific measured variables and from power-unit-specific constant parameters of a given power unit, for governing said first control unit for the given power unit.

7. The control equipment according to claim 6, wherein the governing power reserve is an additional power being provided within seconds.

8. The control equipment according to claim 6, wherein said computation unit is a first computation unit, and including a second computation unit being connected to said first control unit for determining a delay time and a rate of change for long-term additional power which must be provided by the given power unit, from the power-unit-specific measured variables and from the power-unit specific constant parameters.

9. The control equipment according to claim 8, including a memory being connected to said second control unit for storing data being derived from changes in a power distribution in the power supply system, and parameters of a simulation model being variable through using the data being stored in said second control unit.

* * * * *